Dec. 7, 1965 W. A. WHITESELL ETAL 3,222,453

OPTICAL SCANNING SYSTEM

Filed July 6, 1962 3 Sheets-Sheet 1

INVENTOR
William A. Whitesell
HARVEY L. COOK, JR.
BY Mason, Fenwick & Lawrence
ATTORNEYS INVENTOR
William A. Whitesell
HARVEY L. COOK JR.
BY
Mason, Fenwick & Lawrence
ATTORNEYS INVENTOR
William A. Whitesell
HARVEY L. COOK, JR.
By Mason, Fenwick & Lawrence
Attorneys United States Patent Office 3,222,453
Patented Dec. 7, 1965

3,222,453
OPTICAL SCANNING SYSTEM

William A. Whitesell, Albuquerque, N. Mex., and Harvey L. Cook, Jr., Falls Church, Va., assignors to Farrington Electronics Inc., Alexandria, Va., a corporation of Massachusetts Filed July 6, 1962, Ser. No. 208,022
7 Claims. (Cl. 178—7.6)

The present invention relates to scanning systems, and more particularly to oscillating mirror optical scanning assemblies for automatic character recognition systems adapted to scan flat copy.

Automatic character recognition systems have been heretofore devised for sensing information-bearing documents and producing electrical output signals identifying information sensed by the apparatus. Such equipment may briefly be described as apparatus for scanning intelligence-bearing documents containing items of information such as printed characters, usually in the form of alphabetical letters and Arabic numerals, which apparatus senses the presence and/or absence of bits of each character thereon with reference to a time and/or positional base and relation, and produces signals indicative of the presence and absence of such bits of characters within the scanning field, an output being produced at some time indicative of the character read. Examples of typical automatic character sensing apparatus are disclosed in U.S. Patent No. 2,663,758, granted December 22, 1953, to David H. Shepard, and U.S. Patent No. 2,897,481, granted July 28, 1959, to David H. Shepard.

In order to provide for high-speed scanning of character-bearing documents such as pages of paper of approximately eight by ten inch size, it is desirable to scan transversely of the document along each successive line of characters on the page or along a selected line or lines of characters of the page. In optical scanning, the document image must move past the scanning device, which motion, however, may be either real or apparent. Advantages are realized if the document is held stationary and merely appears to move by means of the oscillating mirror system. One of the arrangements for effecting such scanning of the document has been to provide an oscillating sweep mirror which is moved about a pivot axis parallel to the vertical axis of the page. Suitable lens means are provided at a fixed station to receive light reflected by the oscillating mirror and focus an image of the associated document portion on a suitable scanning disk assembly which effects detail scanning of each character image for activating one or more photocell detectors. However, there are two primary requirements for such an oscillating mirror device: (a) the documents must remain in reasonable focus maintaining a constant magnification ratio and (b) the apparent document motion must be uniform. The focus requirement is the more difficult to meet.

It will be apparent that, if the mirror oscillates about a stationary pivot axis, the point of sharp focus at the document sweeps in an arc about the mirror axis as the mirror sweeps across the document. One solution to preserve sharp focus with such an oscillating mirror is to impart an arc to the document at the reading station corresponding to the arc through which sharp focus sweeps.

In most applications, however, the document must remain flat at the reading station. With a simple oscillating mirror movable about a stationary pivot axis, space limitations and focus requirements dictate a maximum sweep of about three and a half inches on a flat document. Many systems today find this limit too restrictive and require sweeps in the range of six inches or more.

An object of the present invention, therefore, is the provision of means for scanning flat stationary copy at uniform velocity by an oscillating mirror activated in such a way as to provide a relatively long sweep while maintaining constant document-to-objective lens distance and constant sweep velocity across the planar document surface.

Another object of the present invention is the provision of novel optical scanning means for scanning character-bearing documents and the like wherein constant document-to-lens distance is preserved without motion of the lens system to thereby maintain constant magnification.

Another object of the present invention is the provision of novel optical scanning means for scanning character-bearing documents at the reading station of automatic character recognition systems and the like wherein constant sweep velocity is maintained across the surface of the flat copy being scanned.

Another object of the present invention is the provision of novel scanning apparatus for scanning flat stationary copy at the reading station of automatic character recognition equipment and the like wherein a mirror is driven in an oscillating manner about a pivot axis to produce a rectilinear scanning trace across the planar surface of the copy and the pivot axis is reciprocated during oscillation of the mirror to preserve a constant-length optical path from the document to a focusing lens through which images of the document reflected by the mirror are directed to maintain all portions of the document within the scanning trace in sharp focus.

Other objects, advantages, and capabilities of the present invention will become apparent from the following detail description, taken in conjunction with the accompanying drawings illustrating a preferred embodiment of the invention.

Figures 1, 2, 6, 7:
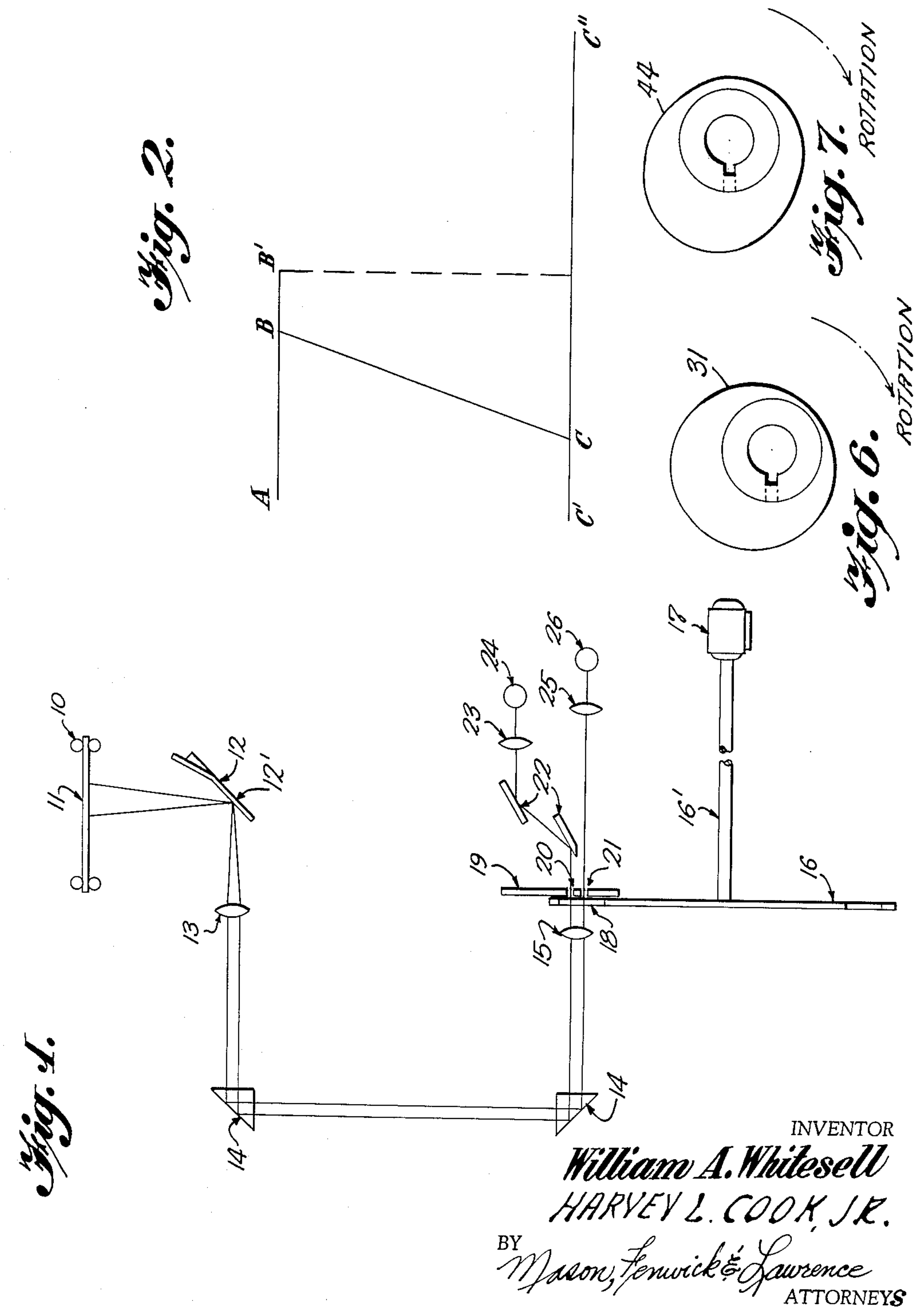
FIGURE 1 is an optical schematic diagram of a form of scanning apparatus with which the present invention may be used.
FIGURE 2 is a diagrammatic illustration of the problem involved in scanning a flat document with an oscillating mirror over a relatively long sweep.
FIGURES 6 and 7 are illustrations of the cam profiles for the mirror displacement cam and the mirror oscillating cam, respectively, of an exemplary embodiment.

Referring to FIGURE 1 which illustrates schematically an example of a scanning assembly for an automatic character sensing system in which the oscillating mirror system of the present invention may be employed, means is provided at 10 for holding the document or copy 11 stationary and in flat, planar condition, while a lateral sweep is made by means of an oscillating mirror 12. Light reflected from the document 11 is bent through various angles by the oscillating mirror 12, and then passes through a focusing or reading lens 13, a pair of prisms 14 and a correcting lens 15 to focus the image of the document on the plane of the scanning disk 16. The scanning disk is provided with a central shaft 16' rigidly affixed thereto which is supported for rotation in suitable fixed bearings. The shaft 16' is driven at high speed by a synchronous motor 17 interconnected with the shaft 16' in any conventional manner. The scanning disk 16 is provided with a number of equally spaced radial slits 18 disposed near the periphery of the disk 16.

In a preferred embodiment, the scanning disk is a 7.5-inch diameter aluminum disk containing 20 0.010 inch wide radial slits 18 spaced at equal intervals of approximately 18 degrees. The scanning disk 16 in this preferred embodiment is rotated at a rate of 7200 revolutions per minute, thereby providing 2400 scans per second as a scan repetition rate. The portion of the image which passes through the radial slits 18 in the scanning disk 16 falls upon a fixed slit plate 19 having a pair of horizontal slits 20, 21 therein which are slightly shorter in length than the spacing between successive radial slits 18 of the scanning disk 16. In a preferred embodiment, these slits are 0.86 inch long, 0.01 inch wide, and are spaced 0.10 inch apart vertically. The beam transmitted by the uppermost fixed horizontal slit 20 is bent laterally into a parallel path with the transmitted beam by a pair of mirrors 22 and is transmitted through an optical loop 23 to the photocathode of a photomultiplier tube 24. The beam transmitted by the lowermost fixed horizontal slit 21 is directed by an optical loop 25 onto the photocathode of a photomultiplier tube 26, resulting in signals emitted by means of a suitable video amplifier to either a transmission apparatus or to the interpreter means of a suitable character recognition apparatus, and thence to an output device such as a paper tape punch, card punch, magnetic tape station, etc. This scanning assembly, except for the oscillating mirror 12, is similar to that disclosed in U.S. Patent No. 2,978,590, issued April 4, 1961, to David H. Shepard.

The basic principle of the reciprocating oscillating mirror system of the present invention is to reciprocate the mirror axis 12' toward the reading lens 13 to compensate for the extra length of the hypotenuse while the mirror is oscillating to cause uniform sweep across the document. This is accomplished in practice by mounting the mirror 12 on a shaft to which is attached an oscillating crank, both of which are cam driven.

The problem involved in scanning a flat document by an oscillating mirror in a manner which will satisfy the requirements outlined for the system of the present invention is illustrated in FIGURE 2. Accepting the tolerable out-of-focus as being optimum, the problem of exceeding a 3½-inch sweep involves deriving relations which:

1. Define the motion of a point B along line $\overline{AB'}$ which maintains the distance $\overline{AB}$ plus $\overline{BC}$ constant; A being fixed, C moving at uniform velocity along $\overline{C'C''}$, and $\overline{AB'}$ being parallel to $\overline{C'C''}$.

2. Define the angular motion of a mirror about moving point B which reflects line $\overline{AB}$ onto line $\overline{C'C''}$ causing the point of intersection C to travel by uniform linear motion.

The final defining equations for the relations defining the displacement of the mirror axis and the angular motion of the mirror to satisfy these conditions are:

$$d=\frac{D}{2}\left(\frac{n^2k^2}{1\pm nk}\right)$$

$$x=\frac{D}{2}\left(\frac{n^2k^2}{1\pm nk}\right)+r\left(\frac{nk}{nk\pm 2}\right)$$

where $d$ is shaft reciprocative displacement, $x$ is crank displacement, and $r$ is crank length. The value of D is controlled by device configuration and the constant $k$ is a function of the total sweep $T_T$, the distance D and the number of points to be calculated, that is $$k=\frac{T_T}{D(n_L\text{ max.}+n_R\text{ max.})}$$

Figures 3, 4:
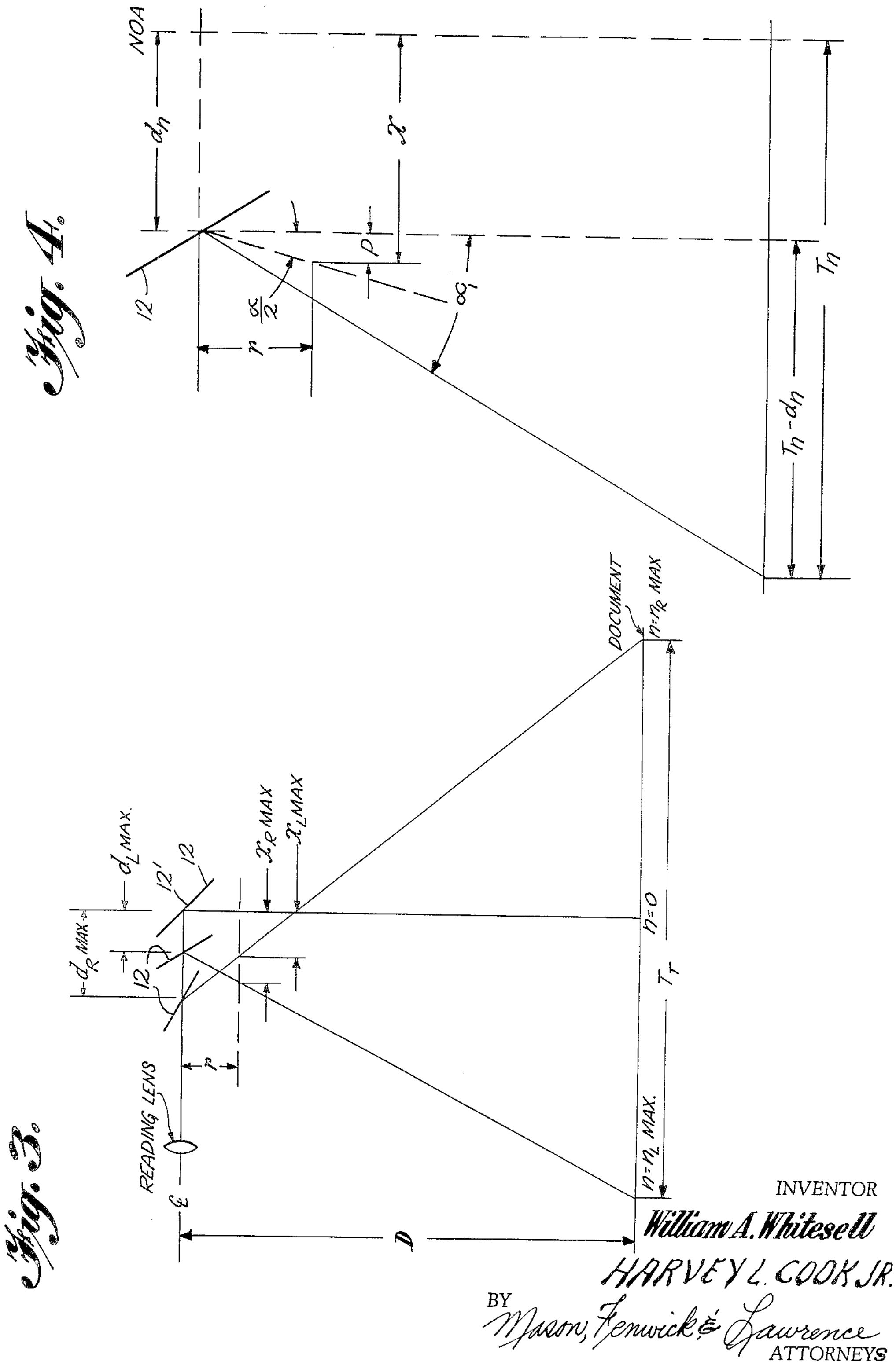
FIGURES 3 and 4 are diagrammatic illustrations of the variables and constants in the solution defining the mirror axis displacement motion and crank displacement, respectively.

The variables and constants in this solution to the problem are diagrammatically indicated in FIGURE 3.

The purpose of the axis displacement $d$ is to hold the document-to-lens distance constant while sweeping the flat document. Referring to FIGURE 3, during sweep, the mirror axis 12' is reciprocated to overcome the extra length of the hypotenuse. Considering the mirror-to-lens optical axis parallel to the document, the shortest distance from the mirror 12 to the document is at the position (referred to as the neutral optical axis) where the mirror is at a 45° angle and the mirror-to-document axis is normal to the document. Sweeping either side of the neutral optical axis requires the mirror to displace toward the lens. The portion of sweep toward the lens from the neutral optical axis is called the left sweep; away from the lens, the right. The geometry of left (L) and right (R) differ by a sign, which carries through the derivation and results in:

$$d_L=\frac{D}{2}\left(\frac{n^2k^2}{1+nk}\right)$$

$$d_R=\frac{D}{2}\left(\frac{n^2k^2}{1-nk}\right)$$

The purpose of the oscillation motion is to impart an angular position to the mirror 12 to achieve a constant rate of sweep across the document. Since the mirror axis 12' is to be reciprocating during the sweep, simple uniform angular velocity is inadequate.

Referring to FIGURE 4 illustrating the variables and constants for the crank displacement relationship during the left sweep, to achieve the desired oscillation, a crank, attached to the mirror shaft, may be displaced relative to the shaft's displacement an amount necessary to impart the required angle to the mirror from the neutral of 45°. This angle is half the angle $\alpha$. The relative displacement (P) between the mirror shaft and the crank is expressed by:

$$P_l=r\left(\frac{nk}{nk+2}\right)$$

$$P_r=r\left(\frac{nk}{nk-2}\right)$$

With the tools established, cam sweep profiles can be computed directly. Assuming sweep from left to right, displacements are calculated from $n=n_{L\text{ max}}$ to $n=o$ by:

$$d_n=\frac{D}{2}\left(\frac{n^2k^2}{1+nk}\right)$$

$$x_n=d_n+r\left(\frac{nk}{nk+2}\right)$$

and from $n=o$ to $n-n_{R\text{ max}}$ by:

$$d_n=\frac{D}{2}\left(\frac{n^2k^2}{1-nk}\right)$$

$$x_n=d_n+r\left(\frac{nk}{nk-2}\right)$$

Fortunately the motions so described result in tolerable velocities and acceleration with a very smooth transition from left sweep to right sweep.

Figure 5:
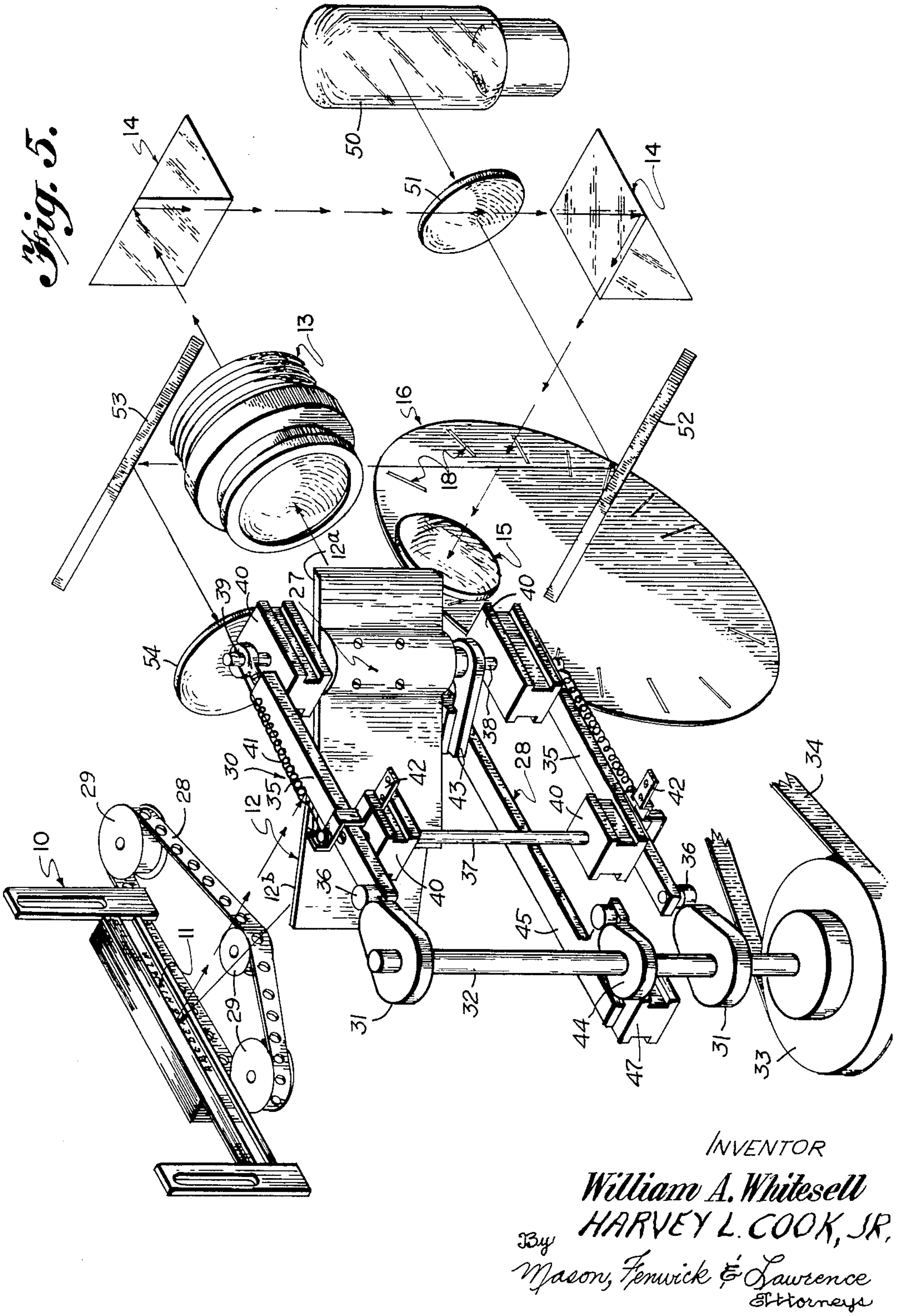
FIGURE 5 is a perspective view of a mechanical arrangement for effecting the desired motion of the oscillating mirror.

FIGURE 5 illustrates in perspective form a mechanical arrangement which may be successfully employed to provide the desired reciprocative displacement of the mirror axis and oscillation of the mirror so as to maintain all portions of the flat document lying within the sweep trace in sharp focus. Referring to FIGURE 5, the documents 11 are maintained in flat planar condition by the holding means 10 at the reading station and are driven by frictional engagement with a feed tape 28 trained about a driven roll and idler rolls indicated generally by the reference character 29. The axis of the mirror 12 is displaced rectilinearly during scanning by means of the reciprocating link assembly indicated generally by the reference character 30 driven by a pair of mirror shaft displacement cams 31. The mirror shaft displacement cams 31 are axially operable along and fixed to a cam shaft 32 having a suitable driven pulley 33 on one end thereof about which is trained a drive belt 34 extending from a suitable motor. The link assembly 30 includes a pair of vertically spaced parallel elongated follower links 35 having follower rolls 36 on an end thereof adjacent the cams 31 which bear against the peripheries of the cams. The follower links 35 are fixed together for coordinate movement by a cross shaft 37. The ends of the follower links 35 remote from the cams 31 include journal members 39 which may be in the form of ball bearing journals which extend about and are coupled to the mirror shaft 38 on which the mirror 12 is fixed. The cross shaft 37 and mirror shaft 38 have guide blocks 40 through which these shafts project, the lateral edges of the guide blocks being provided with elongated grooves to slidably receive track surfaces, such as the side edges of elongated slots in mounted plates, to guide the follower links 35 rectilinearally responsive to rotation of the cams 31. Biasing springs 41 coupled at one end to the mirror shaft 38 and at the other to stationary anchoring brackets 42 continuously bias the follower rolls 36 toward the cams 31.

The mirror shaft 38 has a crank arm 43 fixed thereto to effect oscillation of the mirror 12 about its pivot axis. The crank arm 43 is moved angularly responsive to the mirror oscillating cam 44 on the shaft 32 by means of a follower link 45 having a follower roll 46 which bears against the periphery of the cam 44 and the other end of which is connected to the crank arm 43 by a pin and slot connection. Guide blocks, one of which is shown at 47, are fixed to the follower link 45 to guide the same in a rectilinear reciprocative path in a manner similar to the action of the guide blocks 40. A biasing spring, not shown, is also connected to the follower link 45 and to a fixed anchor to bias the follower roll 46 toward the cam 44.

The mirror 12 illustrated in FIGURE 5 is shown as having a specific form wherein two mirror sections 12*a* and 12*b* fixed to each other are inclined with respect to one another. The section 12*a* is the portion which is used in the optical scanning system previously described, and the portion 12*b* is employed to effect illumination of the document zone being scanned. To this end a light source 50 may be provided, the light from which is focused by a lens 51, redirected by mirrors 52 and 53, and directed through lens 54 on to the mirror section 12*b* from whence the light is reflected onto the portion of the document being examined by the optical scanning system. However, it will be understood that such an illumination system is merely shown by way of example and a variety of optical illumination systems may be employed.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for scanning a flat planar object surface along a rectilinear scanning zone paralleling a preselected axis of the object surface comprising a light reflecting member having a planar light reflecting surface for receiving an incident beam of light from an elemental area of the object surface and redirecting the light along a reflected beam inclined to the incident beam toward fixed light sensing means, a fixed lens intercepting said reflected beam to focus an image of said elemental area in a selected image plane adjacent said light sensing means, motor driven means for continuously oscillating said light reflecting member through a scanning stroke about a pivot axis at said reflecting surface arranged parallel to the plane of said object surface and perpendicular to said preselected axis for sweeping said incident beam periodically back and forth rectilinearly across substantially the full dimension of said object surface to scan the elemental areas thereof intercepting said incident beam, and motor driven means for rectilinearly reciprocating said light reflecting member concurrently with oscillation thereof in a direction parallel to said reflected beam to continuously maintain images of said elemental areas sharply focused in said selected image plane, said means for oscillating said light reflecting member including means coordinated with the rectilinear reciprocation of said light reflecting member for continuously maintaining constant the sweep velocity of the incident beam at the planar object surface during its scanning stroke.

2. In apparatus for scanning a flat planar object surface, the combination recited in claim 1, including a pivot shaft fixed to said light reflecting member, a rigid crank arm fixed to and projecting radially from said pivot shaft, journal bearing means for said shaft supported for rectilinear sliding movement along a slide axis paralleling said reflected beam, cam follower means coupled to said crank arm and said journal bearing means, and motor driven cam means for actuating said cam follower means shaped to cause said cam follower means to impart the oscillating and rectilinear reciprocative movement to said light reflecting member.

3. In apparatus for scanning a flat planar object surface, the combination recited in claim 1, including a pivot shaft fixed to said light reflecting member, a rigid crank arm fixed to and projecting radially from said pivot shaft, journal bearing means for said shaft supported for rectilinear sliding movement along a slide axis paralleling said reflected beam, cam follower means coupled to said crank arm and said journal bearing means, and motor driven cam means for actuating said cam follower means shaped to cause said cam follower means to impart the oscillating and rectilinear reciprocative movement to said light reflecting member and angularly drive said crank arm to maintain the sweep velocity constant throughout the scanning stroke.

4. Optical scanning apparatus for use with an automatic character sensing device and the like to scan areas of a flat planar character-bearing document passing through a reading station along scanning stokes each traversing a whole line of characters on the document, comprising means providing an angular optical path extending between the document and fixed light sensing means of the character sensing device including a light reflecting member having a planar reflecting surface disposed at the angle of said path to receive an incident beam of light from an elemental area of the document and reflect the same along a fixed reflected beam axis toward the light sensing means, a fixed lens interposed in said reflected beam axis to focus an image of the elemental area of the document in a selected image plane adjacent said light sensing means, means for continuously oscillating said light reflecting member about a pivot axis at the reflecting surface paralleling the document plane and perpendicular to the axes of the lines of characters on the document for sweeping said incident beam through a rectilinear scanning stroke spanning a whole line of characters, and means for recilinearly reciprocating the pivot axis of said light reflecting member concurrently with oscillation of the reflecting member in a path parallel to said reflected beam axis to continuously maintain images of said elemental areas sharply focused in said selected image plane, said means for oscillating said light reflecting member including means coordinated with the rectilinear reciprocation of said light reflecting member for continuously maintaining constant the sweep velocity of the incident beam at the plane of the document during its scanning stroke.

5. In apparatus for scanning a flat planar object surface, the combination recited in claim 4, including a pivot shaft fixed to said light reflecting member, a rigid crank arm fixed to and projecting radially from said pivot shaft, journal bearing means for said shaft supported for rectilinear sliding movement along a slide axis paralleling said reflected beam, cam follower means coupled to said crank arm and said journal bearing means, and motor driven cam means for actuating said cam follower means shaped to cause said cam follower means to impart the oscillating and rectilinear reciprocative movement to said light reflecting member.

6. Optical scanning apparatus for use with an automatic character sensing device and the like to scan areas of a flat planar character-bearing document passing through a reading station along scanning strokes each traversing a whole line of characters on the document, comprising means providing an angular optical path extending between the document and fixed light sensing means of the character sensing device including a light reflecting member having a planar reflecting surface disposed at the angle of said path to receive an incident beam of light from an elemental area of the document and reflect the same along a fixed reflected beam axis toward the light sensing means, a fixed lens interposed in said reflected beam axis to focus an image of the elemental area of the document in a selected image plane adjacent said light sensing means, an oscillating cam and cam follower means for continuously oscillating said light reflecting member about a pivot axis at the reflecting surface paralleling the document plane and perpendicular to the axes of the lines of characters on the document for sweeping said incident beam through a rectilinear scanning stroke spanning a whole line of characters, and a translating cam and cam follower means for rectilinearly reciprocating the pivot axis of said light reflecting member concurrently with oscillation of the reflecting member in a path parallel to said reflected beam axis to continuously maintain images of said elemental areas sharply focused in said selected image plane, a pivot shaft fixed to said light reflecting member, a rigid crank arm fixed to and projecting radially from said pivot shaft, journal bearing means for said shaft supported for rectilinear sliding movement along a slide axis paralleling said reflected beam axis, means coupling the translating cam follower means to said bearing means to move the latter and said pivot shaft along said path of rectilinear reciprocating motion, means coupling the oscillating cam follower means to said crank arm to impart oscillating movement to said light reflecting member, and means mounting the oscillating cam and translating cam on a common driven shaft to coordinate movement of said cams.

7. Optical scanning apparatus for use with an automatic character sensing device and the like to scan areas of a flat planar character-bearing document passing through a reading station along scanning strokes each traversing a whole line of characters on the document, comprising means providing an angular optical path extending between the document and fixed light sensing means of the character sensing device including a light reflecting member having a planar reflecting surface disposed at the angle to said path to receive an incident beam of light from an elemental area of the document and reflect the same along a fixed reflected beam axis toward the light sensing means, a fixed lens interposed in said reflected beam axis to focus an image of the elemental area of the document in a selected image plane adjacent said light sensing means, a pivot shaft fixed to said light reflecting member defining a pivot axis therefor at the reflecting surface, a pair of parallel elongated rigid follower arms journaled at a corresponding end thereof to opposite end portions of said pivot shaft and having cam follower means at the other ends thereof, slidable support members connected to said pivot shaft and follower arms at locations spaced longitudinally of the follower arms and supported for rectilinear sliding movement along a slide axis paralleling said reflected beam axis, a rigid crank arm fixed to and projecting radially from said pivot axis, an elongated rigid link having cam follower means at one end thereof and coupled at the other end to said crank arm eccentrically of the pivot shaft and extending generally parallel to said follower arms intermediate the latter, a driven cam shaft, a pair of oscillating cams on said cam shaft engaging the cam follower means on said follower arms for continuously oscillating said light reflecting member about a pivot axis at the reflecting surface paralleling the document plane and perpendicular to the axes of the lines of characters on the document for sweeping said incident beam through a rectilinear scanning stroke spanning a whole line of characters, at a constant rate of sweep at the document plane across the document, and a translating cam on said camshft engaging the cam follower means on said follower link for rectilinearly reciprocating the pivot axis of said light reflecting member concurrently with oscillation of the reflecting member in a path parallel to said reflected beam axis to continuously maintain images of said element areas sharply focused in said selected image plane.

References Cited by the Examiner

UNITED STATES PATENTS 2,262,584 11/1941 Herriott ------------ 178—7.6

DAVID G. REDINBAUGH, *Primary Examiner.*

J. A. O'BRIEN, *Assistant Examiner.*